(12) United States Patent
Vecera et al.

(10) Patent No.: US 10,175,776 B2
(45) Date of Patent: Jan. 8, 2019

(54) KEYBOARD MODE SELECTION BASED ON INPUT FIELD TYPE

(75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 159 days.

(21) Appl. No.: 12/952,689

(22) Filed: Nov. 23, 2010

(65) Prior Publication Data

US 2012/0127078 A1 May 24, 2012

(51) Int. Cl.
*G06F 3/023* (2006.01)

(52) U.S. Cl.
CPC .................. *G06F 3/0233* (2013.01)

(58) Field of Classification Search
None
See application file for complete search history.

(56) References Cited

U.S. PATENT DOCUMENTS

| | | | | |
|---|---|---|---|---|
| 5,949,416 A * | 9/1999 | Bush | | 715/708 |
| 6,333,455 B1 * | 12/2001 | Yanase et al. | | 84/609 |
| 6,654,950 B1 * | 11/2003 | Barnishan | | 717/136 |
| 7,096,036 B2 * | 8/2006 | Griffin et al. | | 455/553.1 |
| 7,301,532 B1 * | 11/2007 | Dobry | | 345/172 |
| 7,720,207 B2 * | 5/2010 | Stanford et al. | | 379/142.07 |
| 7,805,159 B2 * | 9/2010 | Griffin et al. | | 455/553.1 |
| 8,300,016 B2 * | 10/2012 | Lu | | G06F 3/048 345/156 |
| 2002/0112200 A1 * | 8/2002 | Hines | | 714/38 |
| 2002/0126097 A1 * | 9/2002 | Savolainen | | 345/168 |
| 2002/0167545 A1 | 11/2002 | Kang et al. | | |
| 2003/0169240 A1 * | 9/2003 | Song | | G06F 3/0233 345/173 |
| 2007/0016862 A1 * | 1/2007 | Kuzmin | | 715/700 |
| 2007/0053734 A1 * | 3/2007 | Pletikosa | | 400/472 |
| 2008/0133222 A1 * | 6/2008 | Kogan et al. | | 704/9 |
| 2009/0070491 A1 * | 3/2009 | Chiu | | 710/5 |
| 2010/0253629 A1 * | 10/2010 | Orsley | | 345/168 |
| 2010/0289746 A1 * | 11/2010 | Tojima et al. | | 345/168 |
| 2011/0181536 A1 * | 7/2011 | Yoshihara | | G06F 3/0233 345/173 |

* cited by examiner

*Primary Examiner* — Duane N Taylor, Jr.
(74) *Attorney, Agent, or Firm* — Lowenstein Sandler LLP

(57) ABSTRACT

An input detection module determines whether an expected input type for an input field in a user interface matches one of a plurality of possible input types associated with a received keyboard input. If the expected input type matches one of the plurality of possible input types, the input detection module enters a character having the expected input type into the input field.

16 Claims, 4 Drawing Sheets

250

| Field Name | Expected Input Types |
|---|---|
| Date | Numbers |
| Name | Letters (mixed case) |
| SSN | Numbers |
| Telephone | Numbers |
| Fax | Numbers |
| Address | Numbers, Letters (mixed case) |
| Zip code | Numbers |
| State | Letters (upper case) |
| Currency | Symbols |
| Value | Numbers |

200

SAMPLE FORM

Date [ ] ~ 202
Name: [ ] ~ 204
SSN: [ ] ~ 206
Telephone: [ ] ~ 208
Fax: [ ] ~ 210
Address: [ ] ~ 212
[ ] ~ 214
Zip code: [ ] ~ 216
State: [ ] ~ 218
Deposit Amount (currency, value): [ ] [ ]
220  222

| Field Name | Expected Input Types |
| --- | --- |
| Date | Numbers |
| Name | Letters (mixed case) |
| SSN | Numbers |
| Telephone | Numbers |
| Fax | Numbers |
| Address | Numbers, Letters (mixed case) |
| Zip code | Numbers |
| State | Letters (upper case) |
| Currency | Symbols |
| Value | Numbers |

Fig. 2B

KEYBOARD MODE SELECTION BASED ON INPUT FIELD TYPE

TECHNICAL FIELD

This disclosure relates to the field of data input and, in particular, to automatic keyboard mode selection based on input field type.

BACKGROUND

The speed of data input can directly affect the efficiency of any computing device. An alphanumeric input device, such as a keyboard, is the most common way for a user to input textual data to a computing device. One feature of a keyboard is providing the user the ability to input a variety of characters and input types into the computing device. A keyboard may be used for alphabetic input (i.e., letters A-Z), numeric input (i.e., numbers 0-9), symbolic input (e.g., @, #, $, %, etc.) or other types of input.

The size of the keyboard and the number of keys thereon have practical limitations, however. At some point, both the size of and the number of keys on a keyboard may become unwieldy. Furthermore, on mobile devices, such as a laptop computer, netbook, smartphone, personal digital assistant (PDA), etc., size constraints limit the number of physical keys on a keyboard. With the number of characters that make up all the forms of input (i.e., alphabetic, numeric and symbolic), it may be unmanageable to have a one to one mapping ratio of characters to keys on the keyboard. Certain keyboards typically have a character to key mapping ratio of two to one or three to one. With multiple characters mapped to each key, the character selection can be made through the use of modifier keys (e.g., the SHIFT key, CTRL key, ALT key, etc.) Each physical key may have a primary input and one or more secondary inputs. The secondary inputs may be selected by pressing the physical key in combination with one of the modifier keys. This technique, however, requires the user to make many additional keystrokes when inputting data. These additional keystrokes take up valuable time and decrease the user's efficiency.

BRIEF DESCRIPTION OF THE DRAWINGS

The present disclosure is illustrated by way of example, and not by way of limitation, in the figures of the accompanying drawings.

FIG. 2A is a block diagram illustrating a sample form including a number of input fields, according to an embodiment.

FIG. 2B is a block diagram illustrating a table of expected input types, according to an embodiment.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for automatic keyboard mode selection based on input field types. In one embodiment, user input is received by a computing device. The user input may be received by an alpha-numeric input device such as a keyboard. The user input may be entered into an input field of a computer application program running on the computing device. The input field may be, for example, part of a form where a user inputs personal information or other data. The input field may have an expected input type stored in an input field properties table. The author of the computer application program may define the expected input type and store that information in the input field properties. The expected input types may include letters, numbers, symbols, or any combination of these or other input types. For example, a field for entering a telephone number may have the expected input type of numbers. Letters or symbols would not be considered valid input types for that field.

When one physical key on a keyboard has multiple characters mapped to it, the characters may have different input types. Thus, when a user presses a key on the keyboard, there may be more than one input type that could possibly be entered to the input field. An input detection module in the computing device can detect the expected input type or types of the selected input field and compares them to the possible input types of the physical key pressed by the user. If there is a match, the input detection module causes the computer application program to enter the matching input into the selected field. This automatic keyboard mode selection prevents the user from having to enter additional keystrokes (i.e., pressing modifier keys) when only one input type is permitted to be entered in the selected input field.

Figure 1:
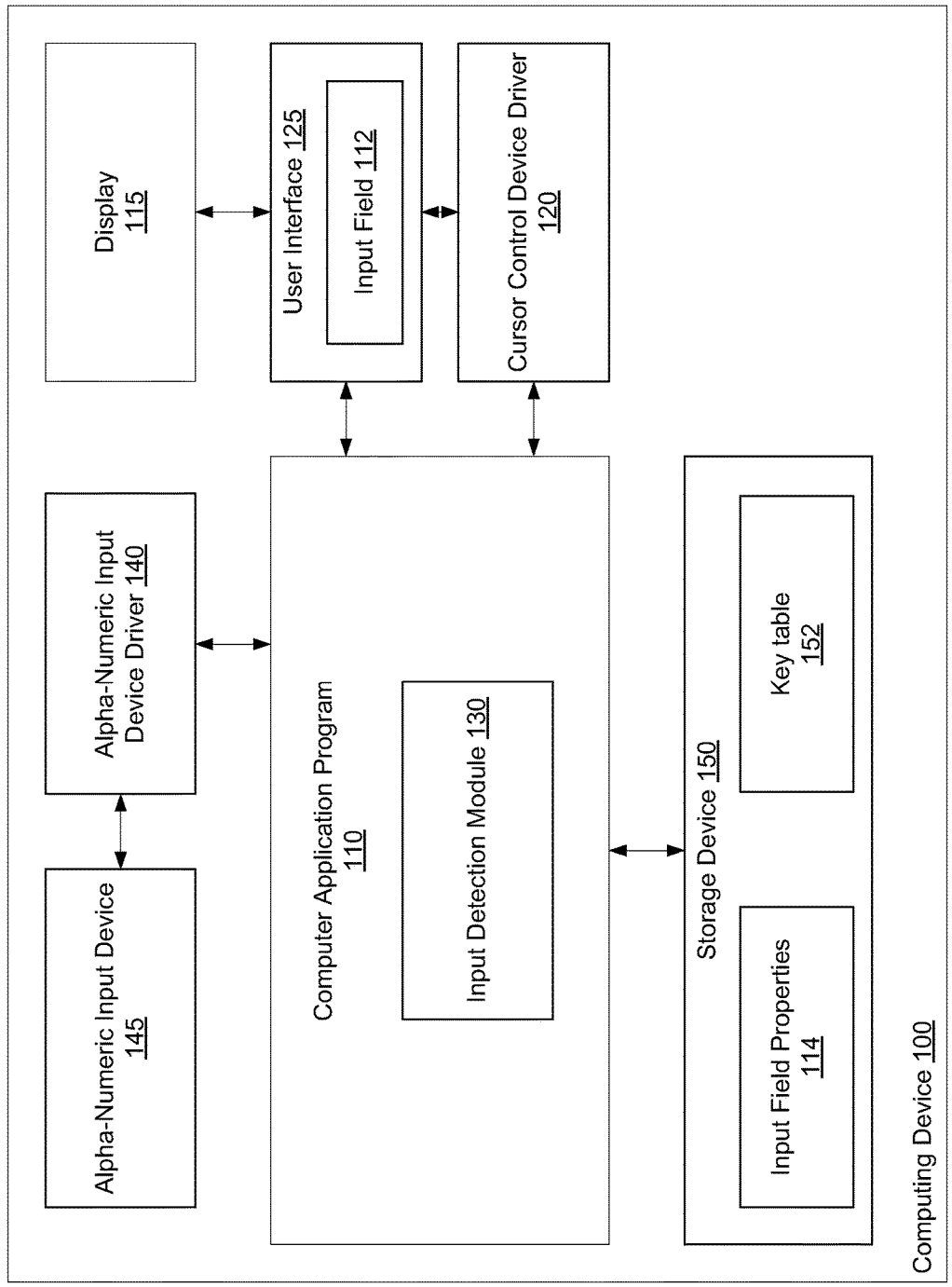
FIG. 1 is a block diagram illustrating a computing device to implement automatic keyboard mode selection, according to an embodiment.

FIG. 1 is a block diagram illustrating a computing device to implement automatic keyboard mode selection, according to an embodiment of the present invention. In one embodiment, computing device 100 includes a computer application program 110, into which a user inputs data. Computer application program 110 may implement the functionality of a word processing program, spreadsheet program, email program, chat program, web browser or other program. In one embodiment, computer application program 110 may be part of an operating system running on computing device 100. Embodiments of the automatic keyboard mode selection described herein may work with any computer application program that receives input from a user. The input may be received by computing device 100 through an alphanumeric input device 145, or other input device, as described below.

Computer application program 110 may provide a user interface 125 (e.g., a graphical user interface (GUI)) that includes one or more input fields 112, into which the user inputs data. The input fields 112, may be for example, part of a form, into which the user may input his or her personal information and/or other data. User interface 125, including the one or more input fields 112, may be displayed on a display device 115. In addition, computer application program 110 may store input field properties 114 in data storage device 150. Data storage device 150 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. Input field properties 114 define the expected input types for each of input fields 112. Input field properties 114 may be stored individually in memory spaces (e.g., individual files or other data structures) corresponding to each input field 112, or may be stored together in a single memory space in the form of a table, such as table 250 shown in FIG. 2B, or other data structure. Such a table could include an entry for each input field 112 and an identifier for a type or types of input data expected for that input field. In one embodiment, the types of input data may include letters, numbers, capital letters, symbols, punctuation marks or other data types. An example of a form including input fields 112 of various input field types is shown in FIG. 2A.

In one embodiment, computing device 100 also includes cursor control device driver 120 to manage operation of a cursor control device. The cursor control device may be, for example, a computer mouse, a trackpad, a trackball, keyboard, or other device. Cursor control device driver 120 translates input received through the cursor control device to control a cursor to interact with computer application program 110. Cursor control device driver 120 also detects when the cursor is used to select an input field 112. For example, the cursor may be placed in an input field, hovered over or near an input field, or otherwise use to select the input field as a location to input data.

Alpha-numeric input device driver 140 controls operation of an alpha-numeric input device 145. The alpha-numeric input device 145 may be, for example, a hardware keyboard having a number of distinct physical buttons or keys. In one embodiment, each physical key has a corresponding physical key code. The physical key code uniquely identifies that particular key so that alpha-numeric input device driver 140 can detect a key press and perform corresponding operations. In some embodiments, the number of characters, including alphabetic, numeric, and symbolic characters, may exceed the number of physical keys on the input device 145. Thus, multiple characters may be mapped to a single physical key. For example, the lower case letter "s", the upper case letter "S" and the symbol "$" may all be mapped to one physical key. When detecting a key press on alpha-numeric input device 145, alpha-numeric input device driver 140 receives the corresponding physical key code and identifies all possible input characters, and their input type (i.e., letter, number, symbol) from a table or other data structure stored in memory.

Computing device 100 further includes input detection module 130. Input detection module 130 is connected to computer application program 110, cursor control device driver 120 and alpha-numeric input device driver 140. Input detection module 130 receives an indication from cursor control device driver 120 that an input field 112 has been selected. Input detection module 130 retrieves the expected input type from input field properties 114. Input detection module 130 receives the possible input characters and types from alpha-numeric input device driver 140 and compares them to the expected input type for input field 112. In one embodiment, input detection module 130 is part of computer application program 110. In other embodiment, however, input detection module 130 may be a separate program, or part of another program, such as for example, an operating system running on computing device 100. Additional details regarding the operation of input detection module 130 are described below with respect to FIG. 3.

FIG. 2A is a block diagram illustrating a sample form including a number of input fields, according to an embodiment. In this embodiment, form 200 includes date field 202, name field 204, social security number (SSN) field 206, telephone number field 208, facsimile number field 210, address fields 212, 214, zip code field 216, state field 218 and deposit amount, including currency field 220 and value field 222. It should be understood that the fields shown in form 200 are merely examples of possible fields and that more, fewer, or other types of input fields may be used. The fields in form 200 may be examples of the one or more input fields 112 shown in FIG. 1 and may include different expected input types. For example, certain fields may expect only numeric input, such as date field 202, SSN field 206, telephone field 208, fax field 210, zip code field 216 and deposit amount value field 222. Thus, when input detection module 130 examines input field properties 114, it will determine that the expected input for these fields is numeric input. Similarly, certain fields may expect only alphabetic input, such as name field 204 and state field 218. The input to state field 218 may be further limited to capital letters, such as those used in two-letter state codes (e.g., "CA" for California). Input field properties 114 may thus identify that the expected input for state field 218 is limited to capital letters. Additionally, certain fields may expect a combination of alphabetic and numeric input such as address field 212. Address field 212 may thus have expected input in input field properties 114 of both letters and numbers. Finally, certain fields, such as deposit amount currency field 220, may expect only symbolic input. Input field properties 114 may thus identify that the expected input for currency field 220 is limited to symbols (e.g., "$" representing United States dollars).

FIG. 2B is a block diagram illustrating a table of expected input types, according to an embodiment. Table 250 may be part of input field properties 114, as shown in FIG. 1, and stored in memory. Table 250 includes a first column identifying a number of different input fields. The input fields may be identified by a field name, an ID number, or other identifier. In this embodiment, the list of fields in table 250 corresponds to fields 202-222 of sample form 200 in FIG. 2A. Table 250 also includes a second column identifying the expected input type or types for each of the fields in the first column. In one embodiment, upon receiving notice that an input field has been selected, input detection module 130 reads table 250 to determine what the expected input types are for the selected field. As will be described below, input detection module 130 will only allow input of the expected type to be entered into the selected field.

Figure 3:
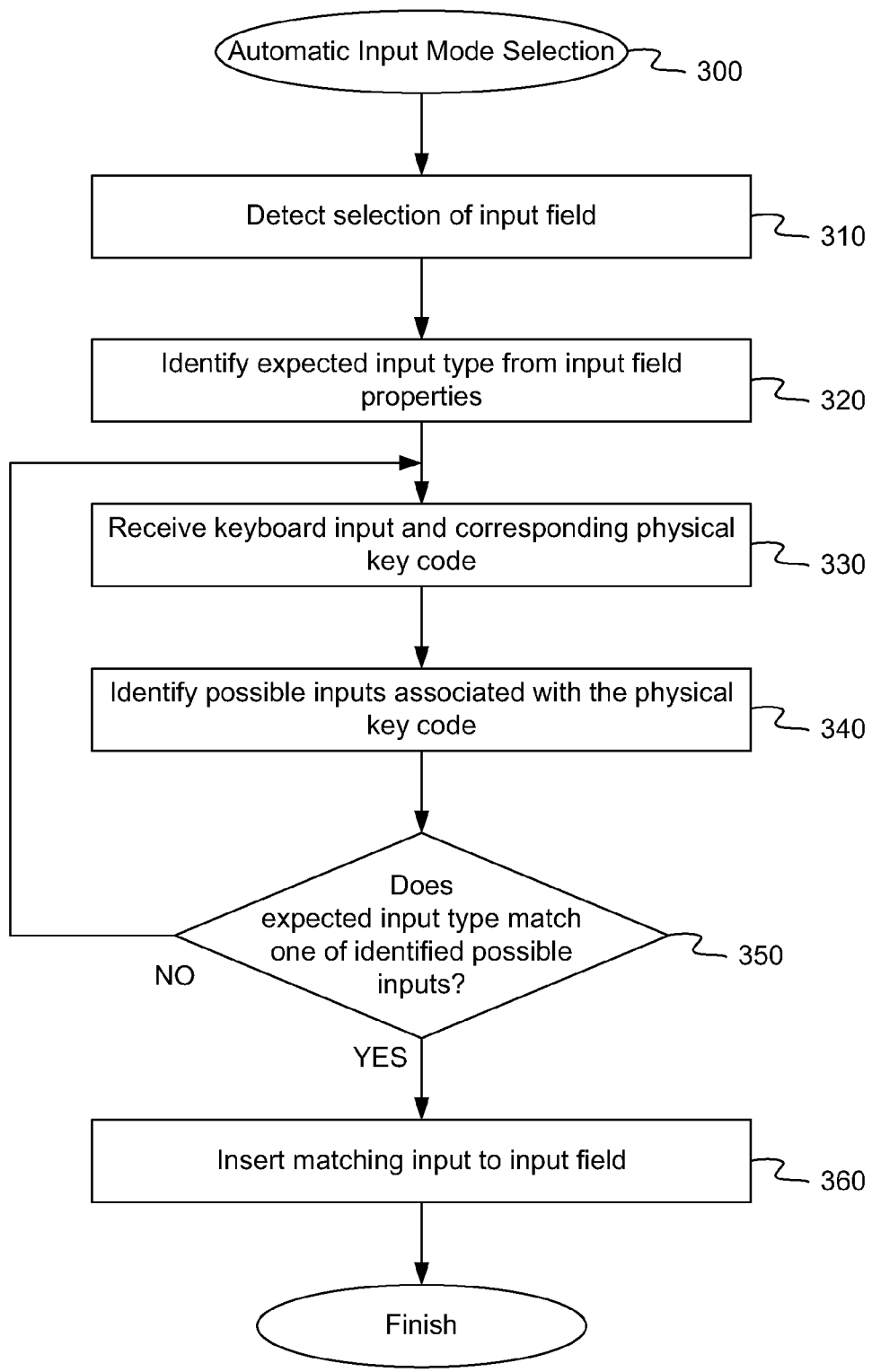
FIG. 3 is a flow diagram illustrating an automatic keyboard mode selection method, according to an embodiment.

FIG. 3 is a flow diagram illustrating an automatic keyboard mode selection method, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to provide an interactive input method to efficiently receive user input in a language where the number of characters is greater than the number of keys on a keyboard. In one embodiment, method 300 may be performed by computing device 100, as shown in FIG. 1.

Referring to FIG. 3, at block 310, method 300 detects the selection of an input field. Cursor control device driver 120 determines that a cursor has been placed in or near an input field 112. The cursor may be controlled by a cursor control device (e.g., a mouse) or by the keyboard (e.g., by pressing the "Tab" key to cycle the cursor through the input fields). Cursor control device driver 120 communicates with input detection module 130 indicating that a particular field may be selected. The selected field may be identified by a field name or by some other unique identifier. At block 320, method 300 identifies an expected input type for the selected input field 112 from input field properties 114. Input field properties may include a table, such as table 250 in FIG. 2B, identifying one or more expected input types for each field. The input types may include, for example, numbers, letters, symbols, or any combination of these or other input types. In one example, the selected input field is telephone number field 208 in FIG. 2A. The expected input type for telephone field 208, shown in table 250, is numbers.

At block 330, method 300 receives a keyboard input and a corresponding physical key code. The keyboard input results from a user pressing a physical key on the keyboard or other alpha-numeric input device 145. Each physical key on a keyboard has a physical key code which uniquely identifies that particular key. As discussed above, multiple characters of different input types may be mapped to a single physical key. At block 340, method 300 identifies possible inputs associated with the physical key code. Alpha-numeric input device driver 140 reads a key table 152 stored in storage device 150 which indicates each character, and that character's input type, associated with the physical key code corresponding to the physical key that was pressed. The input type of the associated characters may be indicated by name or by some other identifier. In one embodiment, a single physical key code may correspond to both a letter and a number. For example, one physical key code is associated with both the letter "f" and the number "5". These characters make up the possible inputs. Alpha-numeric input device driver 140 provides the possible inputs to input detection module 130.

At block 350, method 300 determines if the expected input type for the selected input field identified at block 320 matches one of the possible input types identified at block 340. In the example above, the expected input type for telephone field 208 was numbers and the possible inputs included the letter "f" and the number "5". Input detection module 130 compares the expected input type to the possible inputs and identifies a match, if any. In this case, only the number "5" matches the expected input type. Thus, at block 360, method 300 inserts the matching input (i.e., the number "5") to the selected input field. If at block 350, method 300 determines that the expected input type does not match any of the possible inputs, method 300 returns to block 330 and waits to receive another keyboard input. If the expected input type does not match any of the possible inputs, none of the possible inputs will be entered. For example, if the expected input type was a number and none of the possible inputs mapped to the physical key pressed were numbers, then the system would not enter any character into the input field. The system would wait until another key is pressed where one of the possible inputs was a number and then enter that number into the input field.

In certain embodiments, method 300 may identify more than one expected input type for a selected field at block 320. For example, if the selected input field was address field 212, input detection module 130 would read table 250 and determine that the expected input types for address field 212 include numbers and letters. If the physical key code corresponds to more than one possible input character, at block 350, method 300 may identify more than one match between the expected input types and the input types of the possible input characters. For example, where the physical key code corresponds to the letter "f" and the number "5", these possible inputs would match both expected input types for address field 212. In such a case, input detection module may resort to a character priority scheme for identifying which character to insert in the input field. The possible inputs associated with the physical key code may be ordered in priority levels, with one input type being the primary input and the other(s) being secondary inputs. The priority levels may also be stored in a table in a storage device. In one embodiment, the primary input is selected in the absence of any modifier keys and the secondary inputs are selected depending on a known combination of one or more modifier keys. For example, for the received physical key code, the letter "f" may be the primary input and the number "5" may be a secondary input, selectable by pressing the physical key at the same time as a modifier key, such as "Alt". In this manner, method 300 may select the intended input character, even though there are multiple matches. In an alternative embodiment, if there are multiple matches, no character is entered and an audible or visual message may be displayed to the user. The user may then explicitly express his intent for the input character by using the appropriate modifier key combinations. Input detection module sends a signal to computer application program 110 causing the program 110 to insert the identified input character in the selected input field 112.

Figure 4:
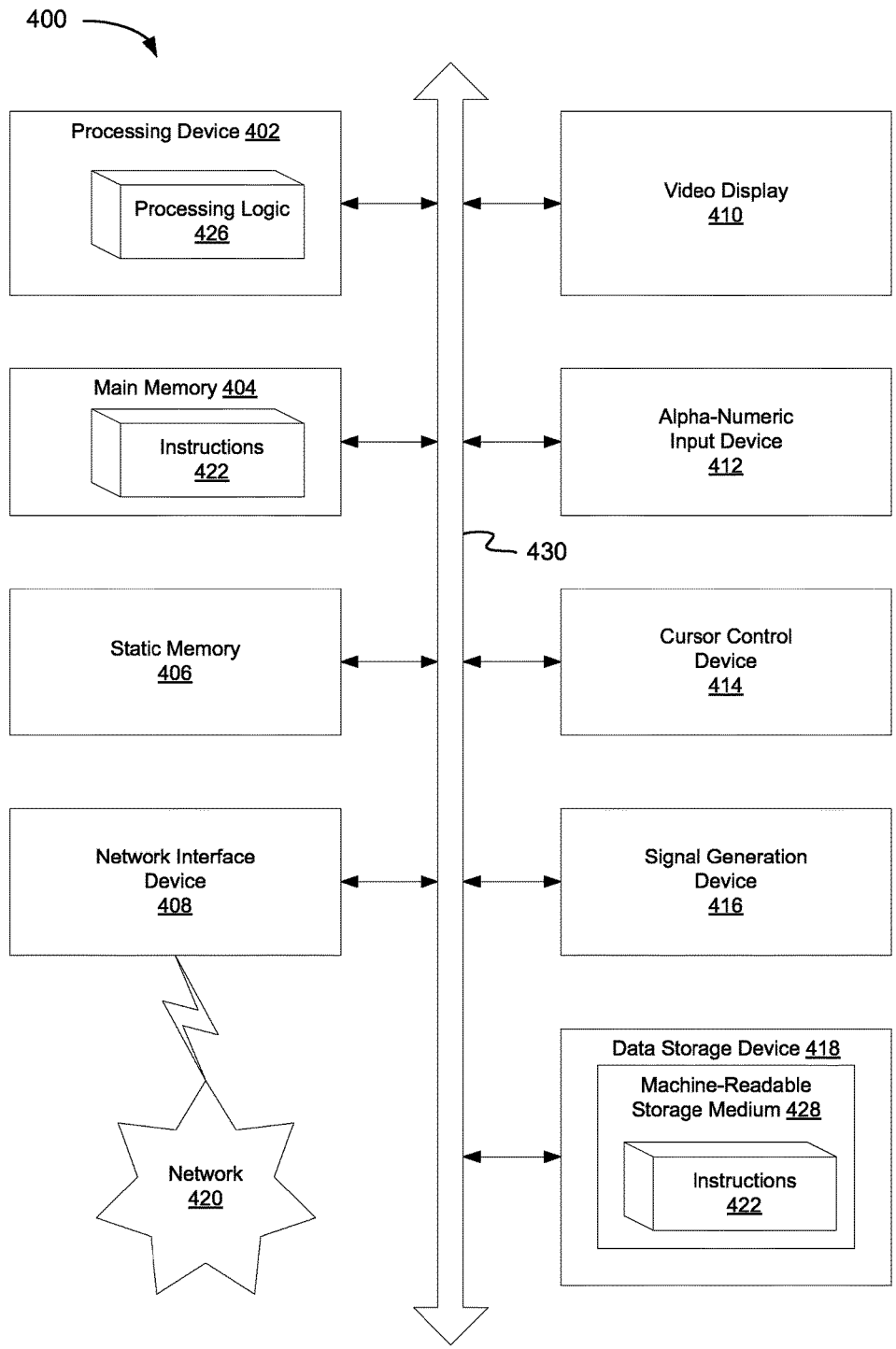
FIG. 4 is a block diagram illustrating one embodiment of a computer system, according to an embodiment.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions to perform a method 300 to automatically determine a keyboard mode selection based on input field types, and/or a software library containing methods that call the above applications. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    detecting selection of a first input field of a plurality of input fields in a graphical user interface presented on a display;
    identifying a first entry in a first data store, the first entry corresponding to the first input field;
    determining, from the first entry in the first data store, that only one of either numeric characters or alphabetic characters are expected to be input to the first input field;
    receiving an indication of a keyboard input, the keyboard input comprising a keystroke of a single key on a physical keyboard, and the indication comprising a physical key code associated with the single key;
    identifying a second entry in a second data store, the second entry corresponding to the single key;
    identifying, from the second entry in the second data store, both at least one individual numeric character corresponding to the physical key code associated with the single key and at least one individual alphabetic character corresponding to the physical key code associated with the single key wherein the second data store is separate from the first data store;
    determining, by a processing device, whether the one of either numeric characters or alphabetic characters matches at least one of the at least one individual numeric character or the at least one individual alphabetic character; and
    in response to the one of either numeric characters or alphabetic characters matching the at least one individual numeric character or the at least one individual alphabetic character associated with the single key, entering a character of the at least one individual numeric character or the at least one individual alphabetic character associated with the single key that matches the one of either numeric characters or alphabetic characters into the first input field.

2. The method of claim 1, wherein the first data store comprises an input field properties table storing expected character types for the plurality of input fields.

3. The method of claim 2, wherein the expected character types comprise at least one of an alphabetic input character, a numeric input character, or a symbolic input character.

4. The method of claim 1, wherein a plurality of characters are associated with the physical key code, the plurality of characters comprising the at least one numeric character and the at least one alphabetic character.

5. The method of claim 4, wherein entering a character of the at least one numeric character or the at least one alphabetic character into the first input field comprises entering one of the plurality of characters associated with the physical key code that has a same input character type as the one of either numeric characters or alphabetic characters.

6. A system comprising:
    a processing device; and
    a memory, operatively coupled to the processing device, the processing device to:
        detect selection of a first input field of a plurality of input fields in a graphical user interface presented on a display;
        identify a first entry in a first data store, the first entry corresponding to the first input field;
        identify, from a first entry in the first data store, a plurality of expected character types to be input in a first input field;
        receive an indication of a keyboard input, the keyboard input comprising a keystroke of a single key on a physical keyboard, and the indication comprising a physical key code associated with the single key;
        identify a second entry in a second data store, the second entry corresponding to the single key;
        identify, from the second entry in the second data store, both a first individual character having a first character type corresponding to the physical key code associated with the single key and a second individual character having a second character type corresponding to the physical key code associated with the single key, wherein the second data store is separate from the first data store;

determine whether more than one of the plurality of expected character types matches at least one of the first character type or the second character type; and in response to more than one of the plurality of expected character types associated with the first input field matching at least one of the first character type or the second character type, determine a priority character type to be entered into the selected input field using an input character priority level which ranks the first and second character types, and enter one of the first individual character or the second individual character having the priority character type into the input field.

7. The system of claim 6, wherein the first data store comprises an input field properties table storing a plurality of expected character types for the input field.

8. The system of claim 6, wherein a plurality of expected character types comprise at least one of an alphabetic input character, a numeric input character, or a symbolic input character.

9. The system of claim 6, wherein a plurality of characters are associated with the physical key code.

10. The system of claim 6, wherein to enter a character having one of the plurality of expected character types into the first input field, the processing device is to enter one of the plurality of characters associated with the physical key code that has a same input character type as the expected character type.

11. The system of claim 6, wherein to determine whether more than one of the plurality of expected character types matches at least one of the plurality of possible character types, the processing device is to compare an identifier of the plurality of expected character types to an identifier for each of the plurality of possible character types, where one of the plurality of expected character types matches a possible character type if the identifiers are the same.

12. A non-transitory machine readable storage medium storing instructions which, when executed, cause a processing device to:

detect selection of a first input field of a plurality of input fields in a graphical user interface presented on a display;

identify a first entry in a first data store, the first entry corresponding to the first input field;

identify, from a first entry in the first data store, a plurality of expected character types to be input in a first input field;

receive an indication of a keyboard input, the keyboard input comprising a keystroke of a single key on a physical keyboard, and the indication comprising a physical key code associated with the single key;

identify a second entry in a second data store, the second entry corresponding to the single key;

identify, from the second entry in the second data store, both a first individual character having a first character type corresponding to the physical key code associated with the single key and a second individual character having a second character type corresponding to the physical key code associated with the single key, wherein the second data store is separate from the first data store;

determine, by the processing device, whether more than one of the plurality of expected character types matches at least one of the first character type or the second character type; and in response to more than one of the plurality of expected character types associated with the first input field matching at least one of the first character type or the second character type, cause display of an indication of the more than one of the plurality of expected character types, receive a selection of a selected character type of the more than one of the plurality of expected character types via a corresponding combination of the single key and a modifier key being selected at a same time, and enter one of the first individual character or the second individual character having the selected character type into the first input field.

13. The storage medium of claim 12, wherein the first data store comprises an input field properties table storing the plurality of expected character types for the input field.

14. The storage medium of claim 12, wherein a plurality of characters are associated with the physical key code, the plurality of characters comprising the plurality of possible types.

15. The storage medium of claim 14, wherein to enter a character having one of the plurality of expected character types into the first input field, the processing device to enter one of the plurality of characters associated with the physical key code that has a same input character type as the expected character type.

16. The storage medium of claim 12, wherein to determine whether more than one of the plurality of expected character types matches at least one of the plurality of possible character types, the processing device to compare an identifier of the plurality of expected character types to an identifier for each of the plurality of possible character types, where one of the plurality of expected character types matches a possible character type if the identifiers are the same.

* * * * *